(12) United States Patent
Stuart et al.

(10) Patent No.: US 10,113,508 B2
(45) Date of Patent: Oct. 30, 2018

(54) GAS TURBINE ENGINE AND METHOD OF ASSEMBLING THE SAME

(71) Applicant: General Electric Company, Schenectady, NY (US)

(72) Inventors: Alan Roy Stuart, Cincinnati, OH (US); Patrick John Lonneman, Erlanger, KY (US)

(73) Assignee: General Electric Company, Schenectady, NY (US)

( * ) Notice: Subject to any disclaimer, the term of this patent is extended or adjusted under 35 U.S.C. 154(b) by 390 days.

(21) Appl. No.: 14/940,543

(22) Filed: Nov. 13, 2015

(65) Prior Publication Data

US 2016/0146155 A1 May 26, 2016

Related U.S. Application Data

(60) Provisional application No. 62/082,726, filed on Nov. 21, 2014.

(51) Int. Cl.

| | |
|---|---|
| *F02K 1/72* | (2006.01) |
| *F04D 19/00* | (2006.01) |
| *F04D 27/00* | (2006.01) |
| *F02K 1/66* | (2006.01) |
| *F02K 1/76* | (2006.01) |

(52) U.S. Cl.
CPC .................. *F02K 1/72* (2013.01); *F02K 1/66* (2013.01); *F02K 1/763* (2013.01); *F04D 19/002* (2013.01); *F04D 27/002* (2013.01); *F05D 2250/241* (2013.01); *F05D 2250/314* (2013.01); *F05D 2250/34* (2013.01); *F05D 2250/51* (2013.01)

(58) Field of Classification Search
CPC .................................. F02K 1/66; F02K 1/763
See application file for complete search history.

(56) References Cited

U.S. PATENT DOCUMENTS

| | | |
|---|---|---|
| 2,634,578 A | 4/1953 | Kallal |
| 2,726,509 A | 12/1955 | Gist et al. |

(Continued)

FOREIGN PATENT DOCUMENTS

| | | |
|---|---|---|
| GB | 1365491 A | 9/1974 |
| GB | 1479149 A | 7/1977 |

(Continued)

OTHER PUBLICATIONS

European Search Report and Written Opinion issued in connection with related EP Application No. 15194920.3-1607 dated Apr. 18, 2016.

(Continued)

*Primary Examiner* — Ninh H Nguyen
*Assistant Examiner* — Jason Davis
(74) *Attorney, Agent, or Firm* — General Electric Company; Ramela Kachur

(57) ABSTRACT

A gas turbine engine having a centerline axis is provided. The gas turbine engine includes a fan and a fan cowl assembly surrounding the fan to define a bypass duct configured to channel airflow for the fan. The fan cowl assembly includes a stationary cowl and a transcowl. The gas turbine engine further includes a plurality of actuators configured for displacing the transcowl relative to the stationary cowl. Each of the actuators is skewed relative to the centerline axis of the engine.

13 Claims, 13 Drawing Sheets

(56) References Cited

U.S. PATENT DOCUMENTS

| | | | |
|---|---|---|---|
| 2,927,424 | A | 3/1960 | Hyde |
| 3,007,304 | A | 11/1961 | Wotton et al. |
| 3,386,247 | A | 6/1968 | Gross et al. |
| 3,729,934 | A | 5/1973 | Denning et al. |
| 3,815,357 | A | 6/1974 | Brennan |
| 3,915,415 | A | 10/1975 | Pazmany |
| 3,936,226 | A | 2/1976 | Harner et al. |
| 3,988,889 | A | 11/1976 | Chamay et al. |
| 4,177,639 | A | 12/1979 | Taylor |
| 4,340,178 | A | 7/1982 | Lawson |
| 4,371,132 | A | 2/1983 | Woodward |
| 4,807,434 | A | 2/1989 | Jurich |
| 4,922,712 | A | 5/1990 | Matta et al. |
| 4,930,307 | A | 6/1990 | Newton |
| 5,090,196 | A | 2/1992 | Balzer |
| 5,230,213 | A * | 7/1993 | Lawson .................. F02K 1/563 244/110 B |
| 5,343,696 | A | 9/1994 | Rohra et al. |
| 5,568,724 | A | 10/1996 | Lindner et al. |
| 5,974,783 | A | 11/1999 | Gonidec et al. |
| 6,053,510 | A * | 4/2000 | Kokotovic ......... B60G 17/0162 280/5.5 |
| 6,170,254 | B1 | 1/2001 | Cariola |
| 9,435,293 | B2 * | 9/2016 | Suciu ....................... F02K 1/72 |
| 2003/0159429 | A1 | 8/2003 | Langston et al. |
| 2009/0111370 | A1 | 4/2009 | Porte et al. |
| 2009/0288386 | A1 | 11/2009 | Marshall et al. |
| 2010/0044503 | A1 | 2/2010 | Bulin et al. |
| 2010/0072324 | A1 | 3/2010 | Teulou |

FOREIGN PATENT DOCUMENTS

| | | |
|---|---|---|
| GB | 1565212 A | 4/1980 |
| JP | 01300044 A | 12/1989 |
| JP | 10196456 A | 7/1998 |
| JP | 2005519213 A | 6/2005 |
| JP | 2008524488 A | 7/2008 |
| JP | 2010505063 A | 2/2010 |

OTHER PUBLICATIONS

European Search Report and Written Opinion issued in connection with corresponding EP Application No. 15195700.8-1607 dated Apr. 20, 2016.

Unofficial English Translation of Japanese Office Action issued in connection with corresponding JP Application No. 2015226190 dated Oct. 4, 2016.

Unofficial English Translation of Japanese Office Action issued in connection with Related JP Application No. 2015222554 dated Nov. 8, 2016.

Zatorski, D.K., et al., Gas turbine engine and method of assembling the same, GE co-pending U.S. Appl. No. 62/083,137, filed Nov. 21, 2014.

Zatorski et al., U.S. Appl. No. 62/083,137, filed Nov. 21, 2014.

Zatorski et al., U.S. Appl. No. 14/873,324, filed Oct. 2, 2015.

Unofficial English Translation of Chinese Office Action issued in connection with corresponding CN Application No. 01511036161.7 dated Jan. 23, 2017.

* cited by examiner

GAS TURBINE ENGINE AND METHOD OF ASSEMBLING THE SAME

CROSS-REFERENCE TO RELATED APPLICATIONS

This non-provisional application claims the benefit of priority under 35 U.S.C. § 119(e) to U.S. Provisional Patent Application No. 62/082,726, entitled "GAS TURBINE ENGINE AND METHOD OF ASSEMBLING THE SAME", filed Nov. 21, 2014, which is herein incorporated in its entirety by reference.

BACKGROUND

The field of this disclosure relates generally to a gas turbine engine and, more particularly, to a gas turbine engine having a transcowl that facilitates providing airflow to a variable pitch fan in reverse thrust mode.

Many known gas turbine engines have a ducted fan and a core arranged in flow communication with one another. The fan provides air to the core (a "core flow") and to a bypass duct surrounding the core (a "bypass flow"). The core compresses the core flow and subsequently mixes it with fuel for igniting the mixture to generate a flow of combustion gas through a turbine. The combustion gas drives the turbine, which in turn drives the fan to generate the core flow and the bypass flow.

With the bypass flow being a source of thrust for the engine, some known fans have blades for which the pitch can be varied to facilitate controlling the thrust. In that regard, these fans can be configured such that the blades, at one pitch angle, generate an aftward directed bypass flow resulting in forward thrust, and, at another pitch angle, generate a forward directed bypass flow resulting in reverse thrust. However, in these known engines, the condition of the bypass flow is often less than optimal in both directions. As such, for gas turbine engines having variable pitch fans, it would be useful to improve the condition of the bypass flow.

BRIEF DESCRIPTION OF THE INVENTION

In one aspect, a gas turbine engine having a centerline axis is provided. The gas turbine engine includes a fan and a fan cowl assembly surrounding the fan to define a bypass duct configured to channel airflow for the fan. The fan cowl assembly includes a stationary cowl and a transcowl. The gas turbine engine further includes a plurality of actuators configured for displacing the transcowl relative to the stationary cowl. Each of the actuators is skewed relative to the centerline axis of the engine.

In another aspect, a method of assembling a gas turbine engine having a centerline axis is provided. The method includes providing a fan and surrounding the fan with a fan cowl assembly to define a bypass duct configured to channel airflow for the fan. The fan cowl assembly includes a stationary cowl and a transcowl, and the method further includes coupling the transcowl to the stationary cowl via a plurality of actuators configured for displacing the transcowl relative to the stationary cowl. Each of the actuators is skewed relative to the centerline axis of the engine.

In another aspect, a gas turbine engine having a centerline axis is provided. The gas turbine engine includes a variable pitch fan and a fan cowl assembly surrounding the fan to define a bypass duct configured to channel airflow for the fan. The fan cowl assembly includes a stationary cowl and a transcowl. The gas turbine engine further includes at least six actuators coupling the stationary cowl to the transcowl such that the transcowl is displaceable relative to the stationary cowl via the actuators to define an auxiliary inlet for airflow into the bypass duct. The actuators are circumferentially spaced apart from one another and are alternatingly skewed relative to the centerline axis so as to be triangulated.

DETAILED DESCRIPTION OF THE INVENTION

The following detailed description sets forth a transcowl for a gas turbine engine and a method of assembling the same by way of example and not by way of limitation. The description should clearly enable one of ordinary skill in the art to make and use the transcowl, and the description sets forth several embodiments, adaptations, variations, alternatives, and uses of the transcowl, including what is presently believed to be the best mode thereof. The transcowl is described herein as being applied to a preferred embodiment, namely a thrust reverser for a gas turbine engine. However, it is contemplated that the transcowl and the methods of assembling the transcowl may have general application in a broad range of systems and/or a variety of commercial, industrial, and/or consumer applications other than thrust reversers for gas turbine engines.

Figure 1:
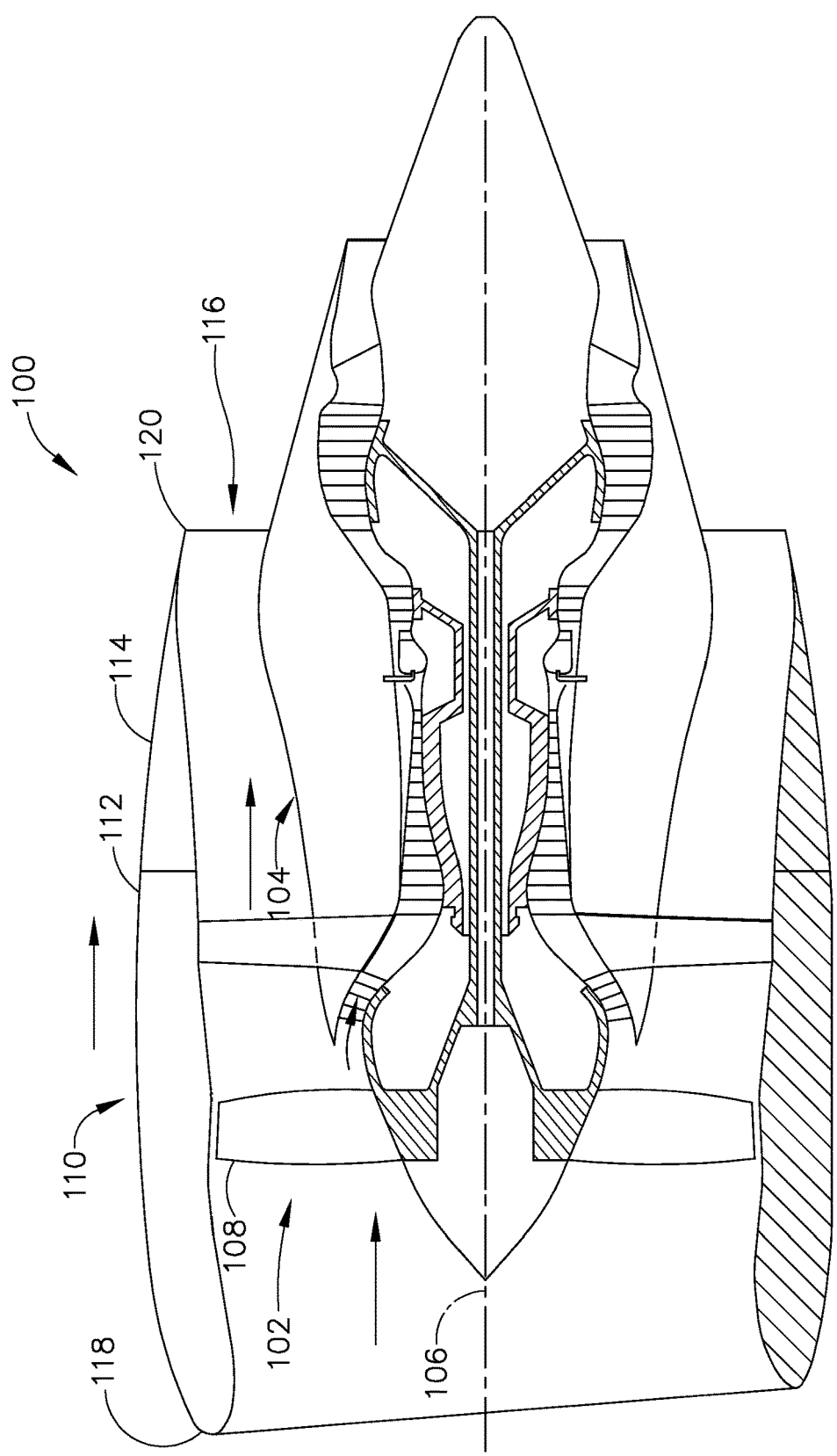
FIG. 1 is a schematic representation of a gas turbine engine operating in forward thrust mode.
Figure 2:
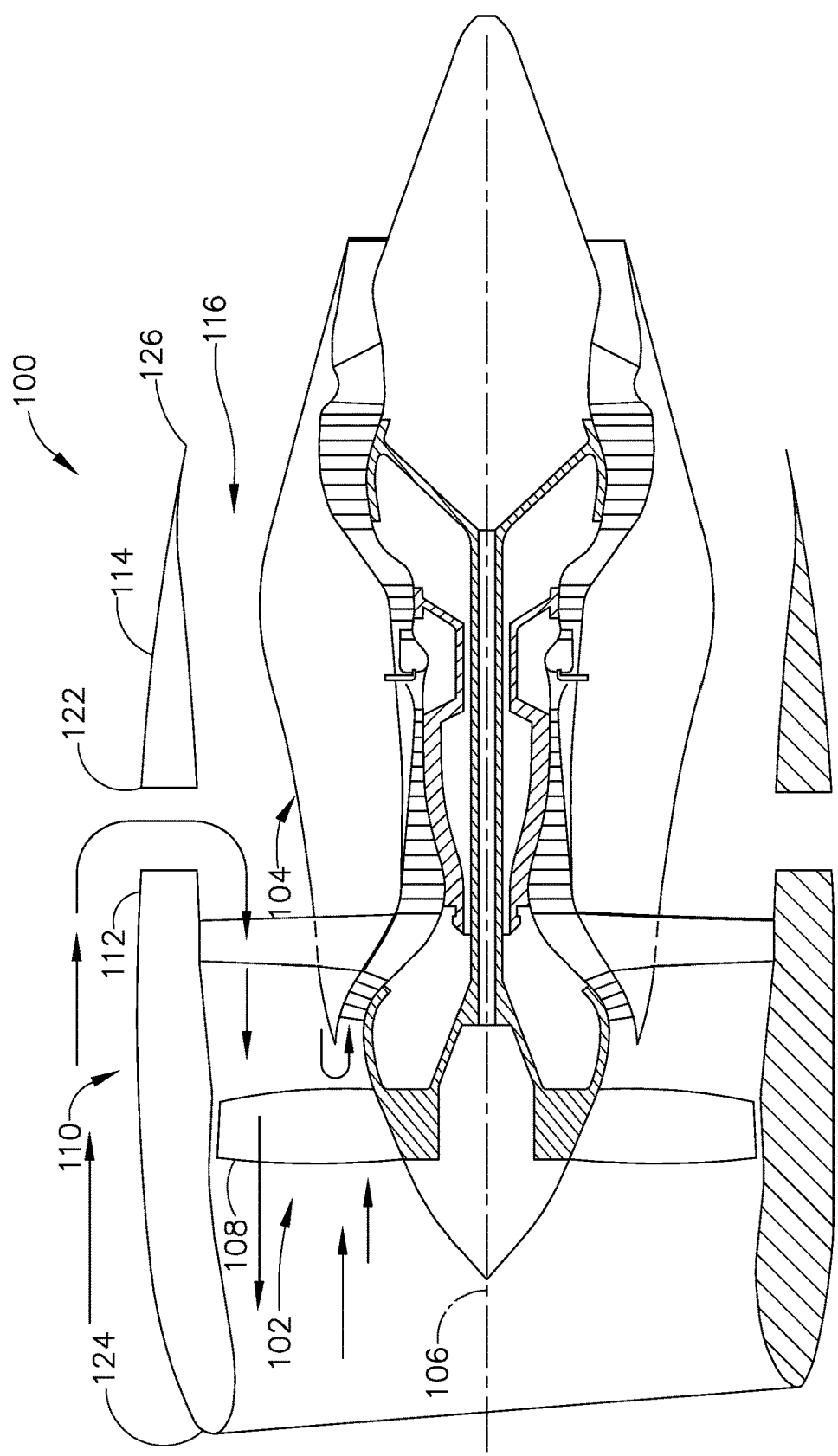
FIG. 2 is a schematic representation of the gas turbine engine shown in FIG. 1 operating in reverse thrust mode.

FIGS. 1 and 2 are schematic illustrations of a gas turbine engine 100 having a fan 102 and a core 104 arranged in flow communication with one another along a centerline axis 106 of engine 100. Fan 102 provides air to core 104 which, in turn, drives fan 102 to produce thrust for engine 100. Fan 102 is a variable pitch fan, meaning that the pitch of its blades 108 can be selectively varied to generate forward thrust or reverse thrust for engine 100. A fan cowl assembly 110 surrounds fan 102 and includes a stationary cowl 112 and a transcowl 114 that collectively define a substantially annular bypass duct 116 about core 104 for channeling airflow for fan 102.

When engine 100 is in its forward thrust mode (FIG. 1), transcowl 114 and stationary cowl 112 abut one another such that airflow enters bypass duct 116 through a forward inlet 118 of bypass duct 116, and exits bypass duct 116 through an aft outlet 120 of bypass duct 116 (i.e., air flows through bypass duct 116 in a forward to aft direction). When engine 100 is in its reverse thrust mode (FIG. 2), however, transcowl 114 is axially spaced apart from stationary cowl 112 to create an auxiliary inlet 122 for air entering bypass duct 116. Notably, in the reverse thrust mode, forward inlet 118 becomes a forward outlet 124, and aft outlet 120 becomes an aft inlet 126. As such, air flows into bypass duct 116 from aft inlet 126 and auxiliary inlet 122, and air exits bypass duct 116 through forward outlet 124 (i.e., air flows through bypass duct 116 in an aft to forward direction). In this manner, auxiliary inlet 122 facilitates providing airflow into bypass duct 116 in a more controlled and stable manner than had the airflow entered bypass duct 116 from aft inlet 126 alone, since airflow entering bypass duct 116 from aft inlet 126 tends to experience more flow separation and, therefore, tends to be less controlled than airflow entering bypass duct 116 through auxiliary inlet 122.

Figure 3:
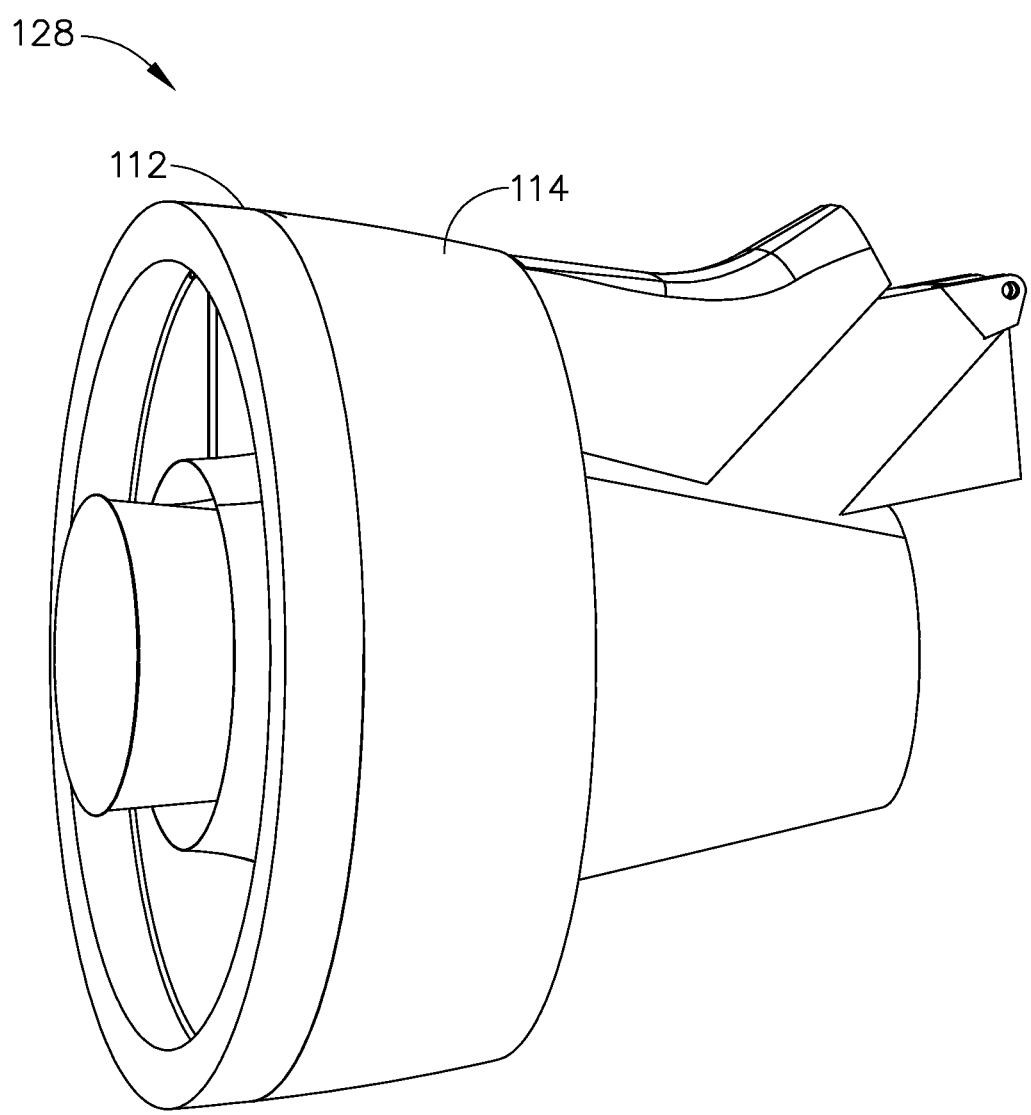
FIG. 3 is a perspective view of an aft segment of the gas turbine engine shown in FIG. 1 configured for the forward thrust mode of FIG. 1.
Figure 4:
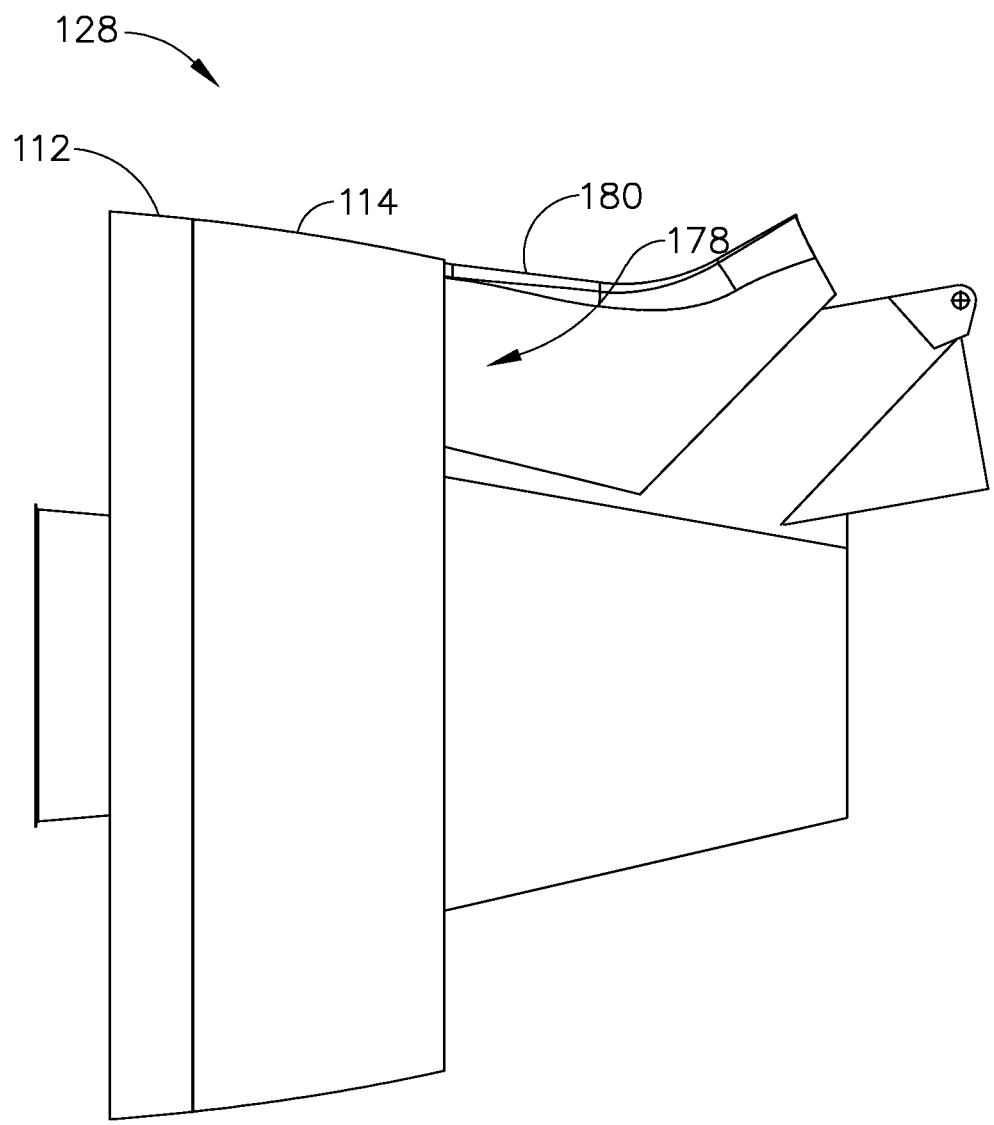
FIG. 4 is a side view of the aft segment configuration shown in FIG. 3.
Figure 5:
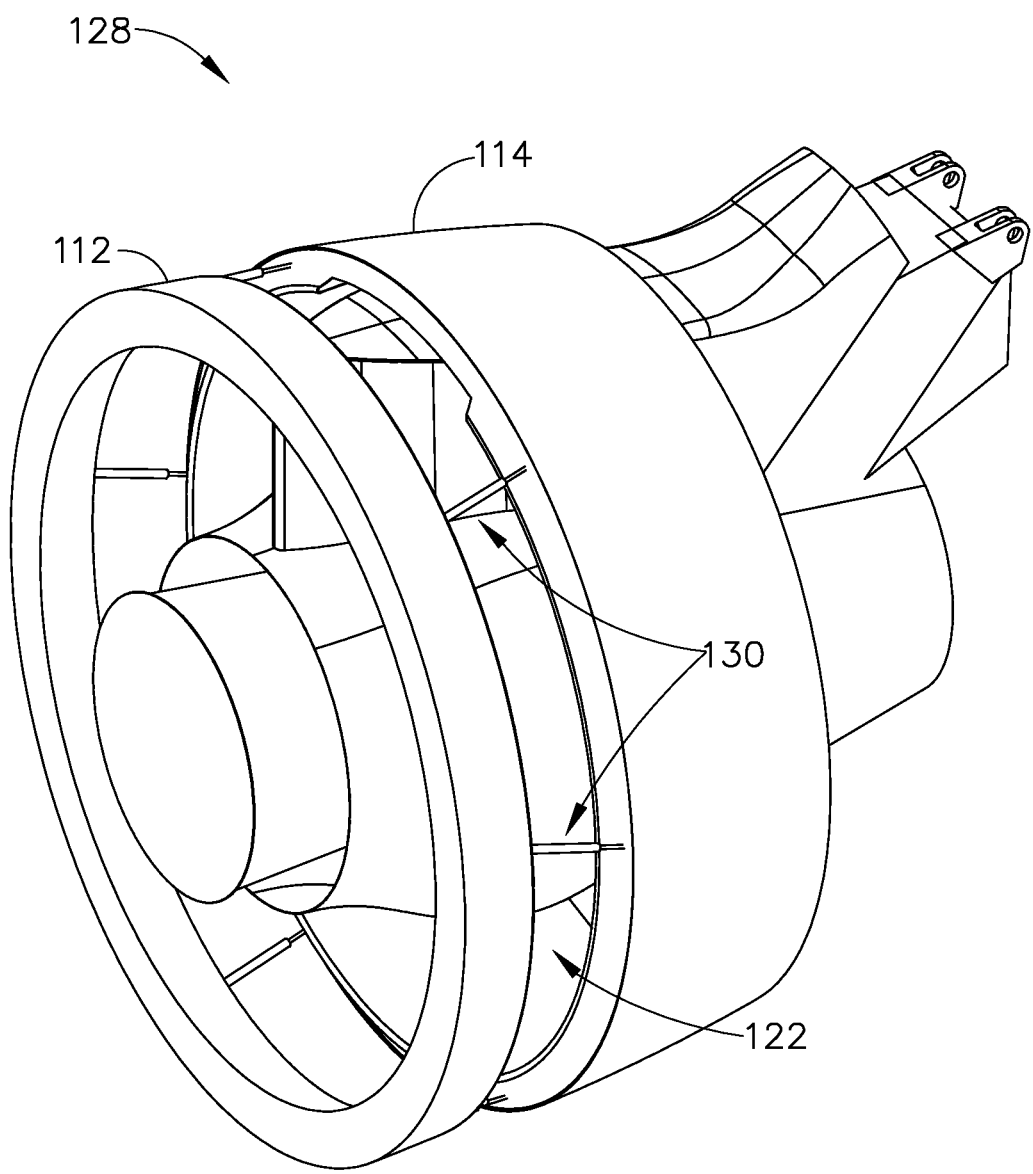
FIG. 5 is a perspective view of the aft segment shown in FIG. 3 and configured for the reverse thrust mode of FIG. 2.
Figure 6:
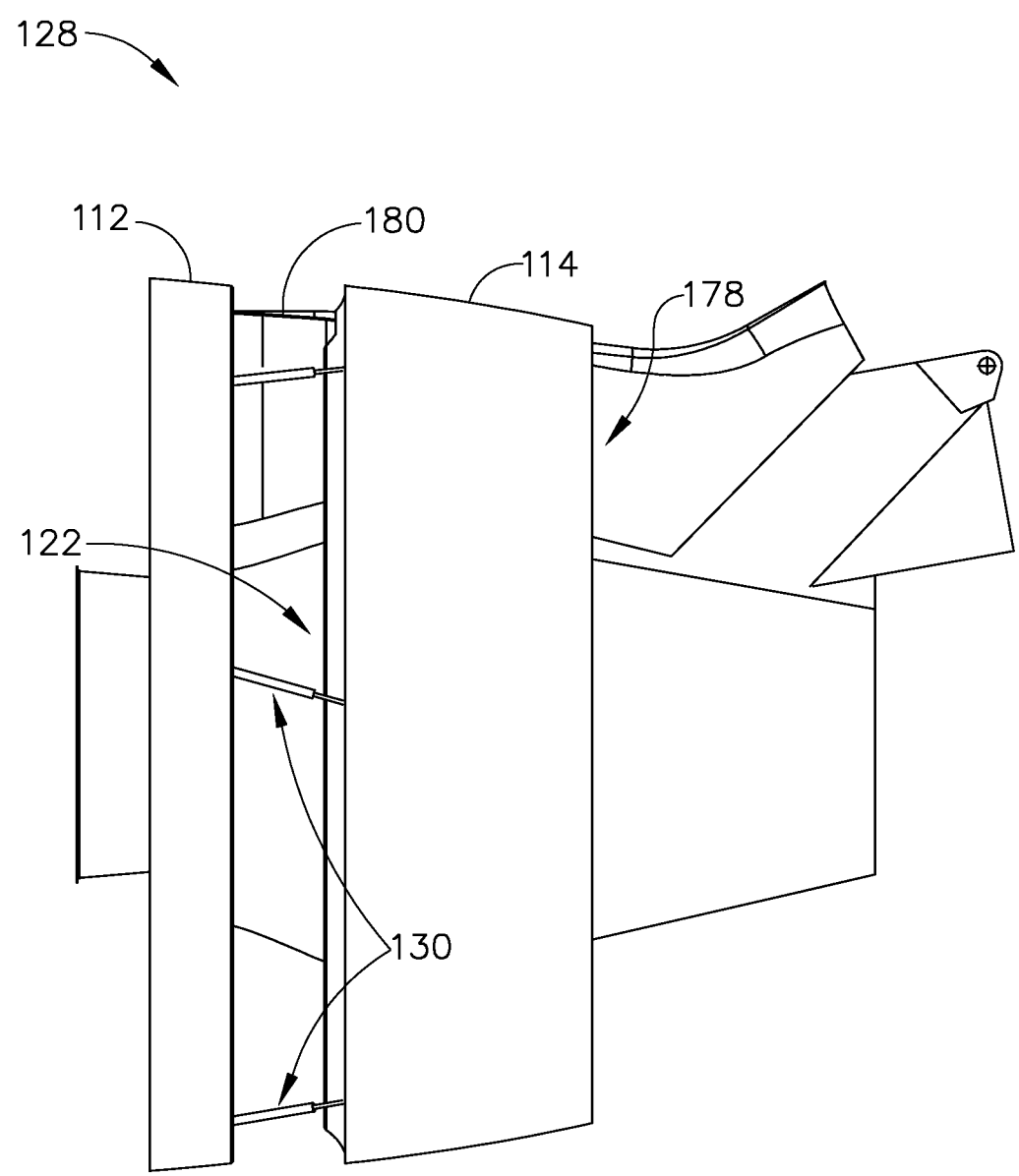
FIG. 6 is a side view of the aft segment configuration shown in FIG. 5.

FIGS. 3 and 4 are perspective views of an aft segment 128 of gas turbine engine 100, and aft segment 128 is configured for forward thrust mode (FIG. 1), in that transcowl 114 is in abutment with stationary cowl 112. In FIGS. 5 and 6, on the other hand, aft segment 128 is configured for reverse thrust mode (FIG. 2), in that transcowl 114 is axially spaced apart from stationary cowl 112 to create auxiliary inlet 122. Notably, engine 100 is provided with an actuator assembly 130 for displacing transcowl 114 relative to stationary cowl 112 in translation substantially parallel to centerline axis 106.

Figure 7:
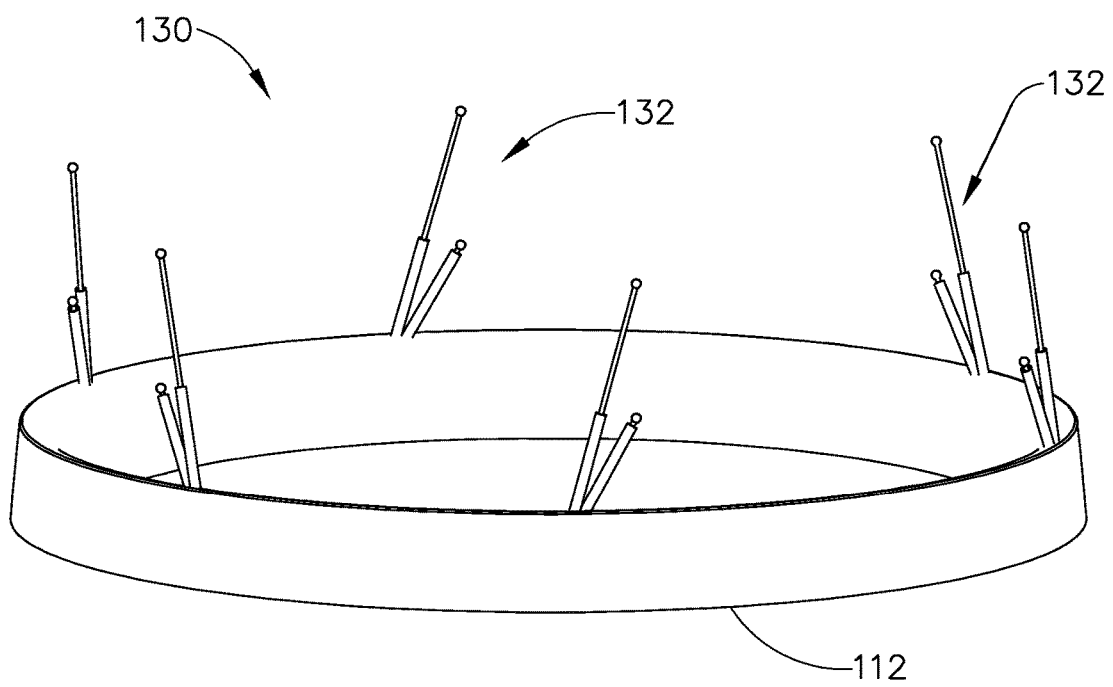
FIG. 7 is a perspective view of an actuator assembly for converting the aft segment between the configurations shown in FIG. 3 and FIG. 5.
Figure 8:
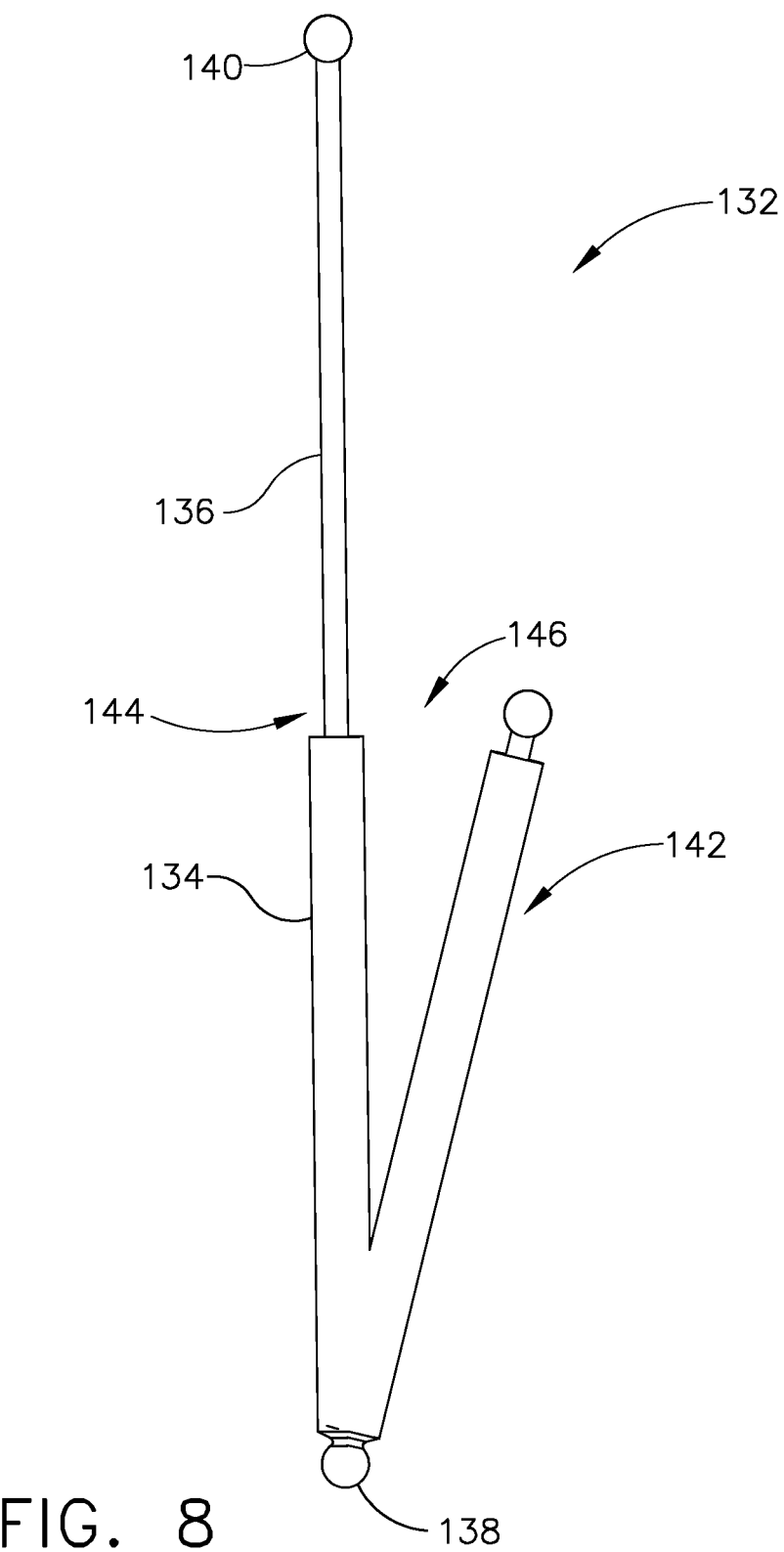
FIG. 8 is a side view of an actuator of the actuator assembly shown in FIG. 7.

FIGS. 7 and 8 illustrate actuator assembly 130 in more detail. In the exemplary embodiment, actuator assembly 130 includes six actuators 132 (a minimum of six actuators 132 equating to the six theoretical degrees of freedom of transcowl 114 in its displacement relative to stationary cowl 112). In other suitable embodiments, actuator assembly 130 may have more than six actuators 132. Notably, each of the illustrated actuators 132 is in the form of a linear actuator having a cylinder 134, a piston 136 slidably inserted into cylinder 134, a first pin joint (e.g., a first spherical bearing 138) mounted on cylinder 134, and a second pin joint (e.g., a second spherical bearing 140) mounted on piston 136. First spherical bearings 138 connect actuators 132 to stationary cowl 112, and second spherical bearings 140 connect actuators 132 to transcowl 114. In this manner, actuators 132 connect transcowl 114 to stationary cowl 112, and function to displace transcowl 114 relative to stationary cowl 112 when deployed.

As set forth in more detail below, actuators 132 are circumferentially spaced apart in their arrangement between stationary cowl 112 and transcowl 114; and, when displacing transcowl 114 relative to stationary cowl 112, each actuator 132 pivots circumferentially during its transition from a stowed state 142 (in which transcowl 114 abuts stationary cowl 112) and a deployed state 144 (in which transcowl 114 is spaced apart from stationary cowl 112). More specifically, when transcowl 114 is in abutment with stationary cowl 112, each actuator 132 is said to be in its stowed state 142; and, when transcowl 114 is fully spaced from stationary cowl 112, each actuator 132 is said to be in its deployed state 144.

Notably, in FIGS. 7 and 8, each actuator 132 is shown in both its stowed state 142 and its deployed state 144, which are separated by a V-shaped spacing 146 that represents the circumferential pivoting that each actuator 132 undergoes during its transition from stowed state 142 to deployed state 144 as described below.

Figure 9:
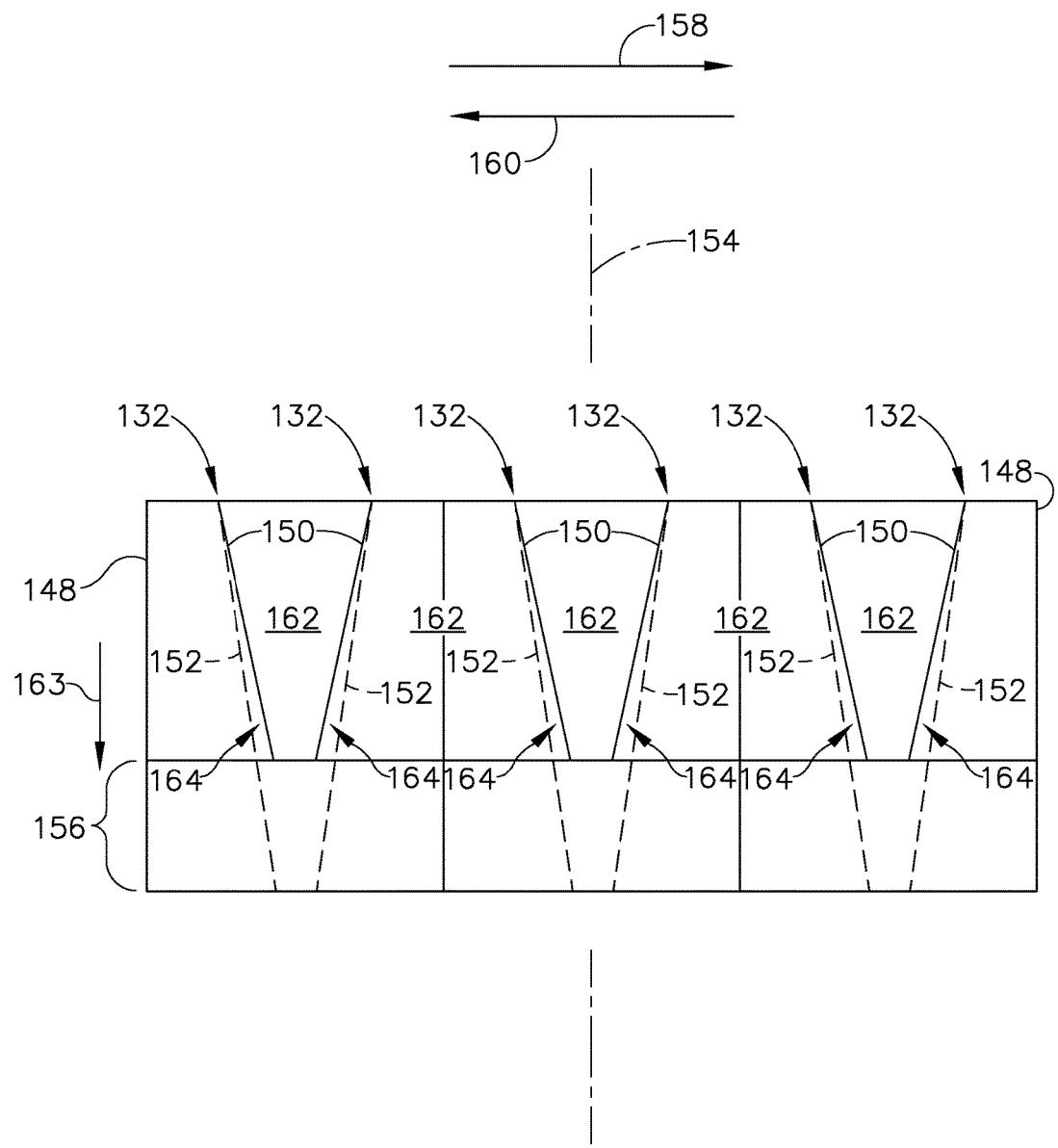
FIG. 9 is a diagram illustrating the actuator assembly shown in FIG. 7 when converting the aft segment between the configurations shown in FIG. 3 and FIG. 5.

Illustrated in FIG. 9 is a diagram of the configuration and function of actuators 132. In the diagram, the circumferential arrangement of actuators 132 has been projected onto a plane (i.e., the annular formation of actuators 132 has been separated at a seam 148 and flattened for illustration purposes). In that regard, each actuator 132 is represented in its stowed state 142 by a stowed actuator line 150, and in its deployed state 144 by a deployed actuator line 152. Moreover, centerline axis 106 of engine 100 is represented by an axis line 154, and the difference in length between the various stowed actuator lines 150 and the various deployed actuator lines 152 along axis line 154 represents a displacement range 156 of transcowl 114.

It is apparent from the diagram that actuators 132 are circumferentially spaced apart about centerline axis 106 and are oriented in an alternatingly skewed manner relative centerline axis 106 and relative to one another. More specifically, the first, third, and fifth stowed actuator lines 150 (from left to right on the diagram) are oriented in a clockwise direction 158 in their forward-aft extension 163 so as to be skewed relative to (i.e., not parallel with) axis line 154. On the other hand, the second, third, and sixth stowed actuator lines 150 (from left to right on the diagram) are oriented in a counterclockwise direction 160 in their forward-aft extension 163 so as to be skewed relative to axis line 154. Oriented in this manner, a spacing 162 between adjacent actuators 132 is, in terms of the diagram, generally triangular in shape when actuators 132 are in their stowed states 142. Moreover, it is apparent from the diagram that actuators 132 remain skewed and continue to have generally triangular spacing 162 in their deployed states 144 as well.

It is also apparent from the diagram that, by virtue of being mounted on spherical bearings 138, 140, each actuator 132 is permitted to pivot in a circumferential direction (i.e., in clockwise direction 158 or counterclockwise direction 160) when transitioning from being stowed to being deployed. More specifically, in its transition from stowed state 142 to deployed state 144, each clockwise-oriented actuator 132 (i.e., each of the first, third, and fifth actuators 132) pivots in counterclockwise direction 160, and each counterclockwise-oriented actuator 132 (i.e., each of the second, fourth, and sixth actuators 132) pivots in clockwise direction 158. To the contrary, in its transition from deployed state 144 back to stowed state 142, each clockwise-oriented actuator 132 pivots in clockwise direction 158, and each counterclockwise-oriented actuator 132 pivots in counterclockwise direction 160. Such pivoting motion is represented in the diagram by spacing 164 between each stowed actuator line 150 and it associated deployed actuator line 152. Notably, within the construct of being triangulated in such a manner, actuators 132 may be oriented at any suitable angles relative to centerline axis 106 (i.e., actuators 132 cannot all be oriented parallel to centerline axis 106). For example, in terms of the diagram, the clockwise-oriented actuators 132 and the counterclockwise-oriented actuators 132 may have their stowed actuator lines 150 respectively angled at about 16° and −16° relative to axis line 154, with their deployed actuator lines 152 being respectively angled at about 30° and −30° relative to axis line 154 (such that spacing 164, or pivoting range, would be about) 14°).

By virtue of actuator assembly 130 having six actuators 132 oriented and pivotable in this manner, better stabilization of transcowl 114 in its displacement relative to stationary cowl 112 is facilitated. More specifically, because adjacent actuators 132 are circumferentially angled in opposite directions, the support structure for transcowl 114 is effectively triangulated, making the support structure more stable (e.g., if actuators 132 were oriented parallel to one another and centerline axis 106, actuators 132 would be more susceptible to bending in response to vertical and lateral loads applied perpendicular to centerline axis 106). In other words, providing six alternatingly-skewed, fixed-length actuators 132 accounts for each of the six theoretical degrees of freedom of transcowl 114 which, in turn, results in a determinate solution for positioning transcowl 114 in space. When fully extended, actuators 132 have a known length and, therefore, transcowl 114 has a determinate deployed position. Likewise, when retracted, actuators 132 have a known length, and the stowed transcowl 114 has a determinate position. Notably, other than actuators 132 themselves, minimal guidance (e.g., no slider tracks) is provided for ensuring translation of transcowl 114 substantially parallel to centerline axis 106.

Figure 10:
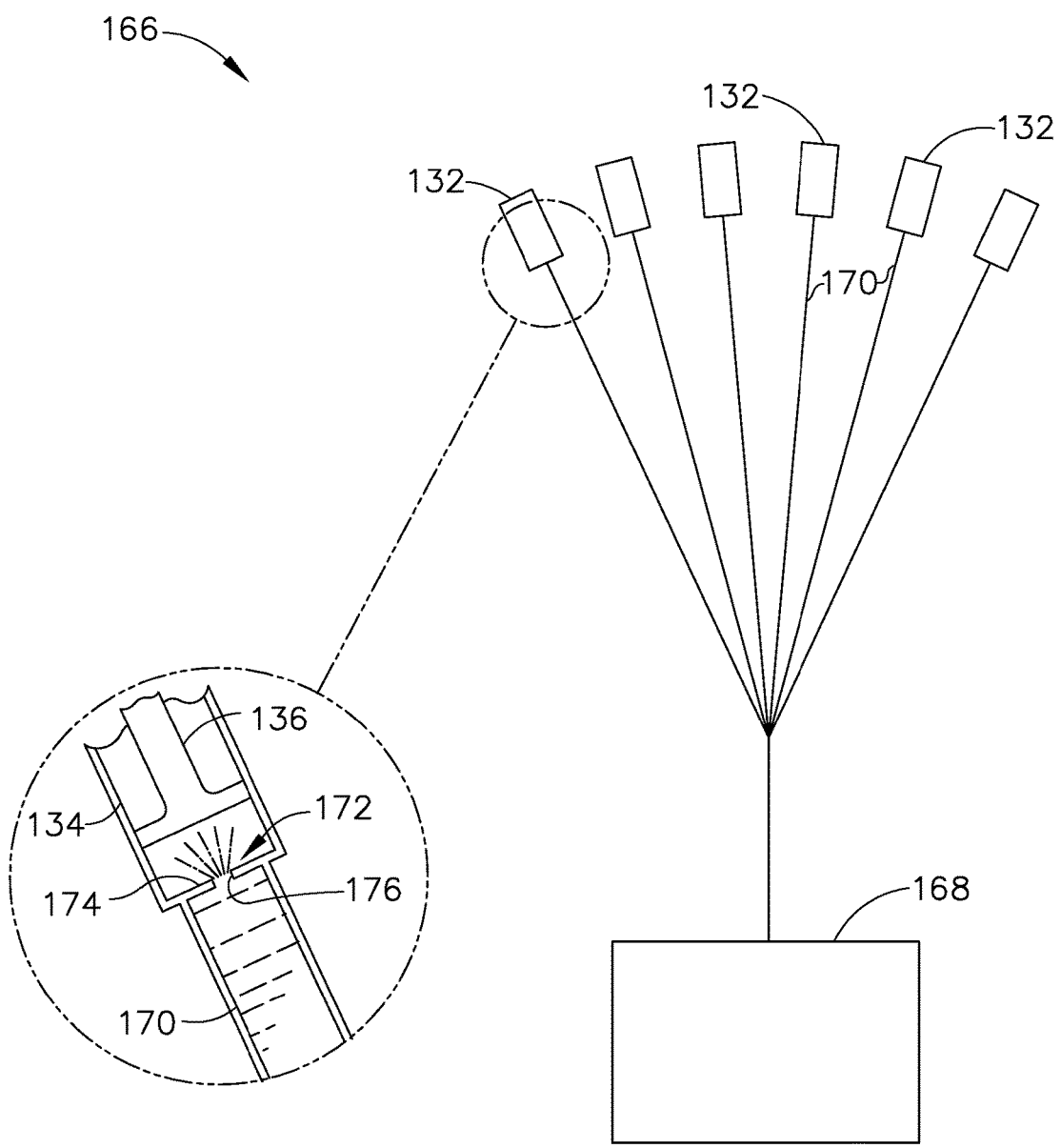
FIG. 10 is a schematic representation of a hydraulic system for operating the actuator assembly shown in FIG. 7.

FIG. 10 illustrates a hydraulic system 166 for operating actuators 132. In the exemplary embodiment, hydraulic system 166 includes a pump 168 and a plurality of conduits 170 for supplying hydraulic fluid from pump 168 to actuators 132 such that each actuator 132 has its own dedicated conduit 170. In other embodiments, conduits 170 may be arranged in any suitable manner that facilitates enabling system 166 to function as described herein. While not shown in FIG. 10, system 166 also includes another plurality of conduits for returning hydraulic fluid from actuators 132 back to a suitable reservoir from which pump 168 draws fluid.

Notably, to facilitate displacement of transcowl 114 substantially parallel to centerline axis 106, actuators 132 should move at substantially the same rate. However, pumping hydraulic fluid along the various conduits 170 at substantially the same pressure does not, in and of itself, ensure substantially equal rates of motion amongst actuators 132 since each actuator 132 may have a different resistance to motion. Thus, a flow limiting member 172 is provided at the junction of each conduit 170 and each cylinder 134 of the associated actuator 132. Flow limiting members 172 collectively facilitate movement of actuators 132 at substantially the same rate despite any variation in resistance from one actuator 132 to the next. In the illustrated embodiment, each flow limiting member 172 is in the form of a plate 174 having an orifice 176 with a diameter less than the diameter of its associated conduit 170 (e.g., conduit 170 may have a diameter of about ⅜", while orifice 176 may have a diameter of about ⅛"). Suitably, in other embodiments, flow limiting member 172 may have any configuration that facilitates enabling hydraulic system 166 to function as described herein.

In the exemplary embodiment, orifices 176 function as a collective unit to facilitate applying substantially the same rate of fluid flow to pistons 136 despite any inherent resistance to displacement of pistons 136 that may exist amongst actuators 132. More specifically, because orifices 176 are smaller than their associated conduits 170, the pressure drop across each orifice 176 adjusts to cause a pressure decrease in actuators 132 that tend to experience less resistance, and an pressure increase in actuators 132 that tend to experience more resistance. In other words, actuators 132 having pistons 136 that tend to be displaced more easily experience an increase in the velocity of the hydraulic fluid passing through their orifices 176, which results in a greater pressure drop across their orifices 176 and, therefore, less pressure being applied to those pistons 136. On the other hand, actuators 132 having pistons 136 that tend to be displaced less easily experience a decrease in the velocity of the hydraulic fluid passing through their orifices 176, which results in less of a pressure drop across their orifices 176 and, therefore, more pressure being applied to those pistons 136. Thus, actuators 132 experiencing lower resistance to displacement will tend to decelerate, and actuators 132 experiencing greater resistance to displacement will tend to accelerate. Hydraulic system 166 thereby establishes a tendency toward equal velocity and displacement amongst actuators 132 and, as a result, facilitates displacement of transcowl 114 in a more parallel manner relative to centerline axis 106. Moreover, because actuators 132 tend to be hydraulically synchronized in such a manner, actuator assembly 130 is not provided with a mechanical synchronization mechanism (e.g., a synchronization cable) coupling actuators 132 together to facilitate movement of actuators 132 in unison. Other embodiments of actuator assembly 130 may, however, include such a mechanical synchronization mechanism.

Figure 11:
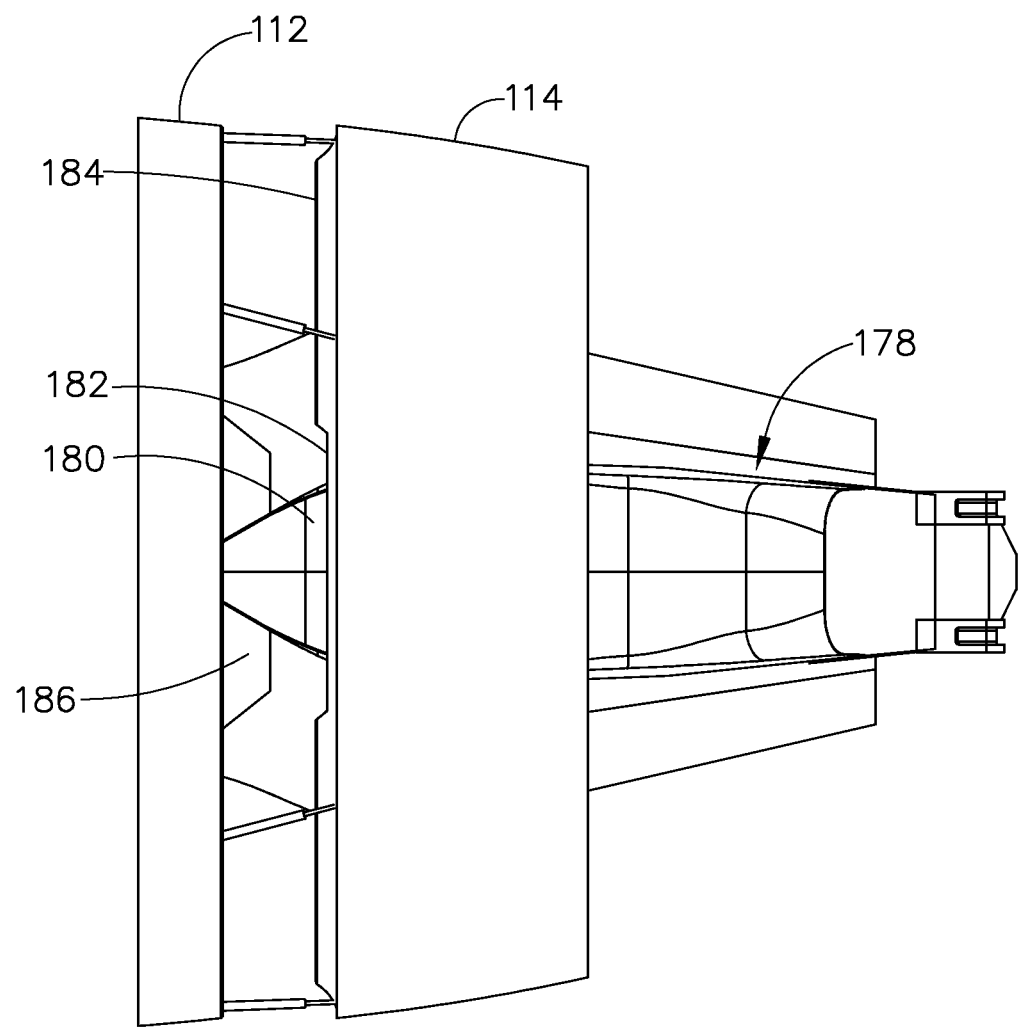
FIG. 11 is a top view of the aft segment configuration shown in FIG. 5.

FIG. 11 illustrates that transcowl 114 is annular (i.e., transcowl 114 extends in) 360° so as to wrap over a top surface 180 of a pylon fairing 178 associated with a pylon that suspends engine 100 from the wing of an aircraft. Referring back to FIGS. 4 and 6, being that top surface 180 of pylon fairing 178 is intended to slide within the annular shape of transcowl 114, top surface 180 of pylon fairing 178 is contoured (e.g., sloped downward) to mirror the interior contour of transcowl 114. As such, displacement of transcowl 114 is facilitated without interference from pylon fairing 178. Nevertheless, contact wear strips may suitably be placed on top surface 180 and/or the side surfaces of pylon fairing 178 to aid in displacing transcowl 114 more smoothly in the event that transcowl 114 rubs against pylon fairing 178 mid-stroke due, for example, to gravity pulling transcowl 114 somewhat downward or a crosswind blowing transcowl 114 somewhat sideways. Additionally, to facilitate minimizing interference from pylon fairing 178, transcowl 114 is provided with a cutout 182 in its forward edge 184 at the top of its annulus, and a matching key 186 (i.e., a stationary filler piece) is provided on stationary cowl 112 and/or pylon fairing 178 for slidable insertion into cutout 182. Cutout 182 provides access to a tunnel formed in the top interior of transcowl 114 through which pylon fairing 178 may pass without interfering with transcowl 114. Moreover, because key 186 is inserted into cutout 182 when transcowl 114 is in abutment with stationary cowl 112, key 186 occupies space in the tunnel, resulting in a reduced affect of the tunnel on the flow area of bypass duct 116 when auxiliary inlet 122 is closed.

Figure 12:
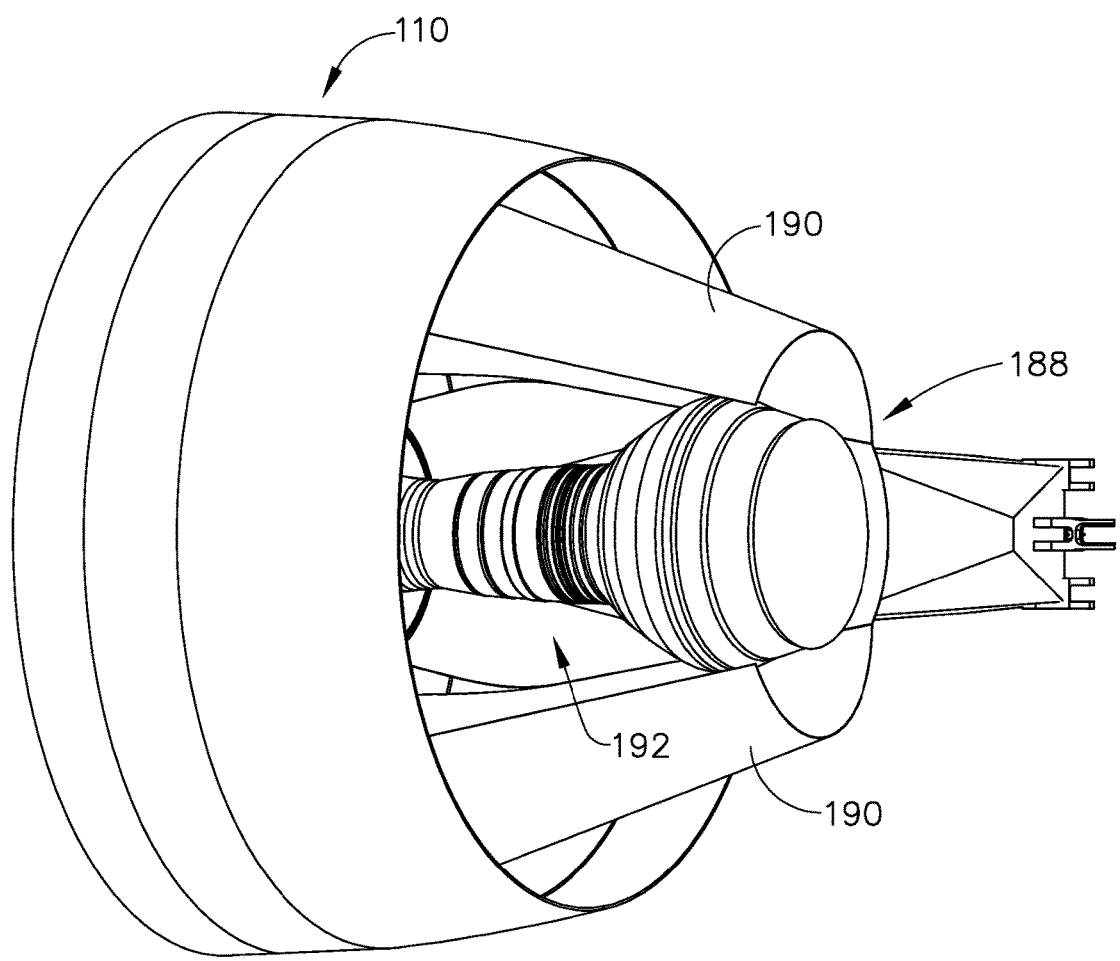
FIG. 12 is a perspective view of the aft segment shown in FIG. 3 with its core cowl open.
Figure 13:
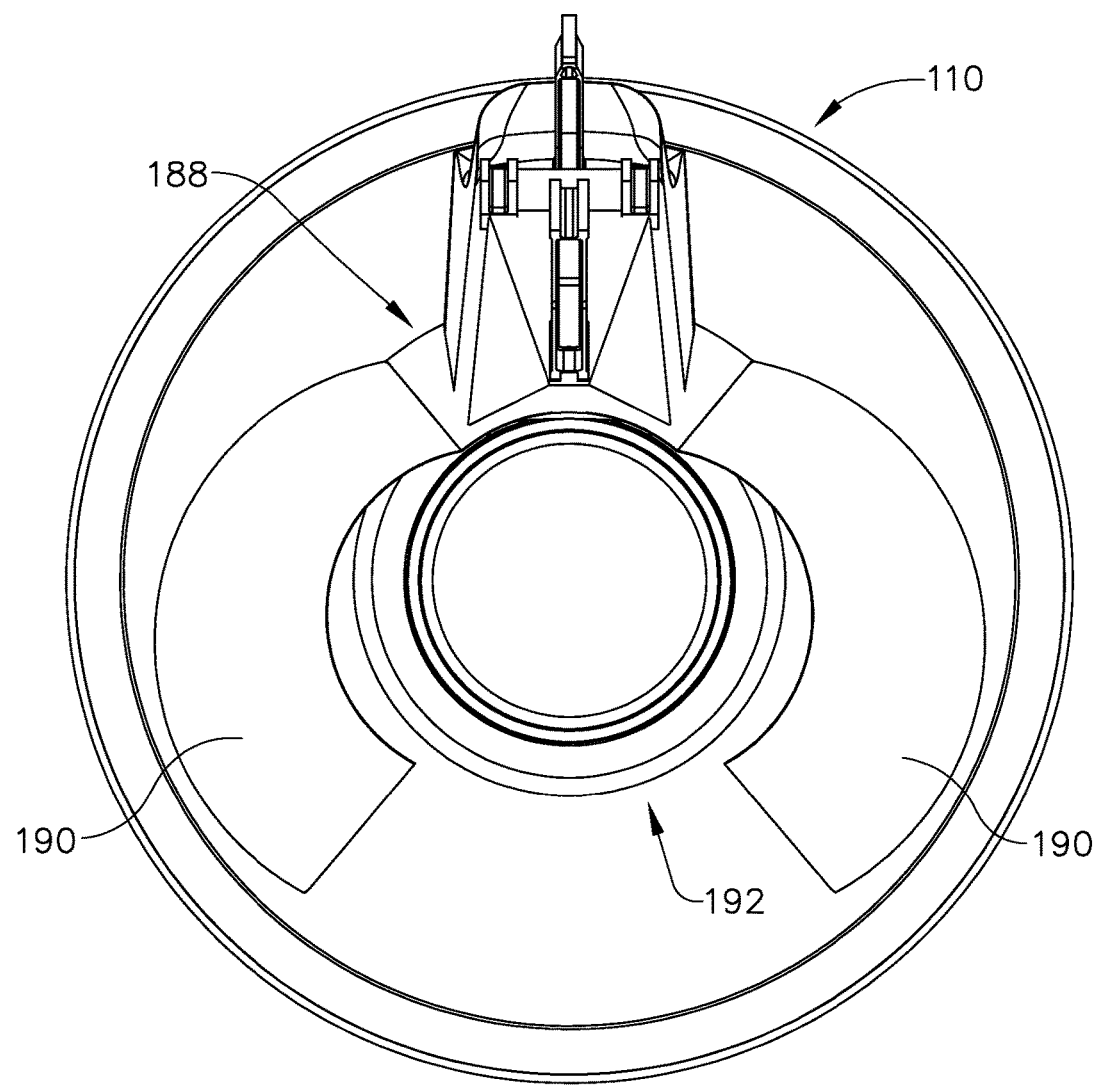
FIG. 13 is a back view of the open core cowl shown in FIG. 12.

FIGS. 12 and 13 illustrate a core cowl 188 of core 104. In the exemplary embodiment, core cowl 188 is provided with a pair of substantially semi-annular doors 190 that are hingedly openable away from one another in a clamshell-like manner to provide access to operational components 192 of core 104 for servicing operational components 192 without having to remove, open, disassemble, or otherwise manipulate fan cowl assembly 110.

The above-described embodiments facilitate providing improved airflow into a bypass duct during reverse thrust mode of a gas turbine engine. The above-described embodiments also facilitate effective displacement of a transcowl for a gas turbine engine and, in that regard, facilitate structurally supporting the transcowl in its displacement without the use of cumbersome support structures such as slider tracks. Additionally, the embodiments facilitate establishing a tendency for equal velocity and displacement of actuators used to displace a transcowl. The embodiments further facilitate providing easier access to core operating components of a gas turbine engine within a core cowl without disturbing a fan cowl assembly that surrounds the core cowl.

Exemplary embodiments of a transcowl and a method of assembling the same are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with only gas turbine engines as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A gas turbine engine having a centerline axis, said gas turbine engine comprising:
    a variable pitch fan configured for generating reverse thrust;
    a fan cowl assembly surrounding said fan to define a bypass duct configured to channel airflow for said fan, wherein said fan cowl assembly comprises a stationary cowl and a transcowl; and
    a plurality of actuators are circumferentially spaced apart from one another, alternatingly skewed in different directions relative to the centerline axis of the engine and configured for displacing said transcowl relative to said stationary cowl to form an auxiliary inlet into said bypass duct when said fan is generating reverse thrust.

2. A gas turbine engine in accordance with claim 1, wherein said plurality of actuators comprises at least six of said actuators.

3. A gas turbine engine in accordance with claim 1, wherein said actuators are pivotable.

4. A gas turbine engine in accordance with claim 3, wherein said actuators are pivotable while displacing said transcowl.

5. A gas turbine engine in accordance with claim 1, wherein said transcowl comprises a front edge having a cutout, and wherein said stationary cowl comprises a key sized for insertion into said cutout.

6. A gas turbine engine in accordance with claim 1, further comprising a core having a core cowl, wherein said core cowl comprises a pair of substantially semi-annular doors that are openable away from one another.

7. A gas turbine engine in accordance with claim 1, further comprising a hydraulic system configured for operating said actuators, said hydraulic system comprising a supply conduit for delivering hydraulic fluid to each of said actuators and a flow limiting member at a junction of said conduit and its associated actuator, wherein each flow limiting member comprises a plate and an orifice defined in said plate, said orifice being smaller than said conduit.

8. A method of assembling a gas turbine engine having a centerline axis, said method comprising:
    providing a fan;
    surrounding the fan with a fan cowl assembly to define a bypass duct configured to channel airflow for the fan, wherein the fan cowl assembly includes a stationary cowl and a transcowl; and
    coupling the transcowl to the stationary cowl via a plurality of actuators configured for displacing the transcowl relative to the stationary cowl, wherein the actuators are alternatingly skewed in different directions relative to the centerline axis of the engine and
    further comprising circumferentially spacing the actuators apart from one another.

9. A method in accordance with claim 8, further comprising providing the fan as a variable pitch fan configured for generating reverse thrust.

10. A method in accordance with claim 9, further comprising connecting the actuators to the stationary cowl and the transcowl such that the actuators are configured for spacing the transcowl from the stationary cowl to form an auxiliary inlet into the bypass duct when the fan is generating reverse thrust.

11. A method in accordance with claim 8, further comprising coupling the transcowl to the stationary cowl via at least six actuators.

12. A method in accordance with claim 8, further comprising pivotably coupling the actuators to the stationary cowl and the transcowl.

13. A gas turbine engine having a centerline axis, said gas turbine engine comprising:
    a variable pitch fan;
    a fan cowl assembly surrounding said fan to define a bypass duct configured to channel airflow for said fan, wherein said fan cowl assembly comprises a stationary cowl and a transcowl;
    at least six actuators coupling said stationary cowl to said transcowl such that said transcowl is displaceable relative to said stationary cowl via said actuators to define an auxiliary inlet for airflow into said bypass duct,
    wherein said actuators are circumferentially spaced apart from one another and are alternatingly skewed relative to the centerline axis so as to be triangulated.

* * * * *